United States Patent

[11] 3,581,595

| [72] | Inventor | Duane E. Carlson<br>3709 4th Ave., South Milwaukee, Wis. 53172 |
|---|---|---|
| [21] | Appl. No. | 829,173 |
| [22] | Filed | June 2, 1969 |
| [45] | Patented | June 1, 1971 |

[54] CAMERA LENS REMOTE CONTROL
8 Claims, 5 Drawing Figs.

[52] U.S. Cl. .................................................. 74/511
[51] Int. Cl. .................................................. G05g 1/08
[50] Field of Search .......................................... 74/511, 504; 350/187

[56] References Cited
UNITED STATES PATENTS
| 2,036,948 | 4/1936 | McNary | 74/504 |
| 2,797,618 | 7/1957 | Bloomberg | 350/187 |
| 3,194,139 | 7/1965 | Babcock | 350/187 |

*Primary Examiner*—Fred C. Mattern, Jr.
*Assistant Examiner*—Wesley S. Ratliff, Jr.
*Attorney*—Robert J. Steininger ABSTRACT: A device for actuating the adjustment mechanism for the combination of lenses on a camera generally known as a zoom from a remote point proximate to the operator's position. Conventional cameras either employ a handle mounted on each support of the Zoomar for extending and retracting such lenses or they are equipped with complex internal adjustment mechanisms. In those cameras which rely on handles mounted on the lens support, a fatiguing reach by the operator makes accurate viewing and careful manipulation difficult. To eliminate such difficulty this invention links lens support actuators with controls at the operator's position.

PATENTED JUN 1 1971
3,581,595
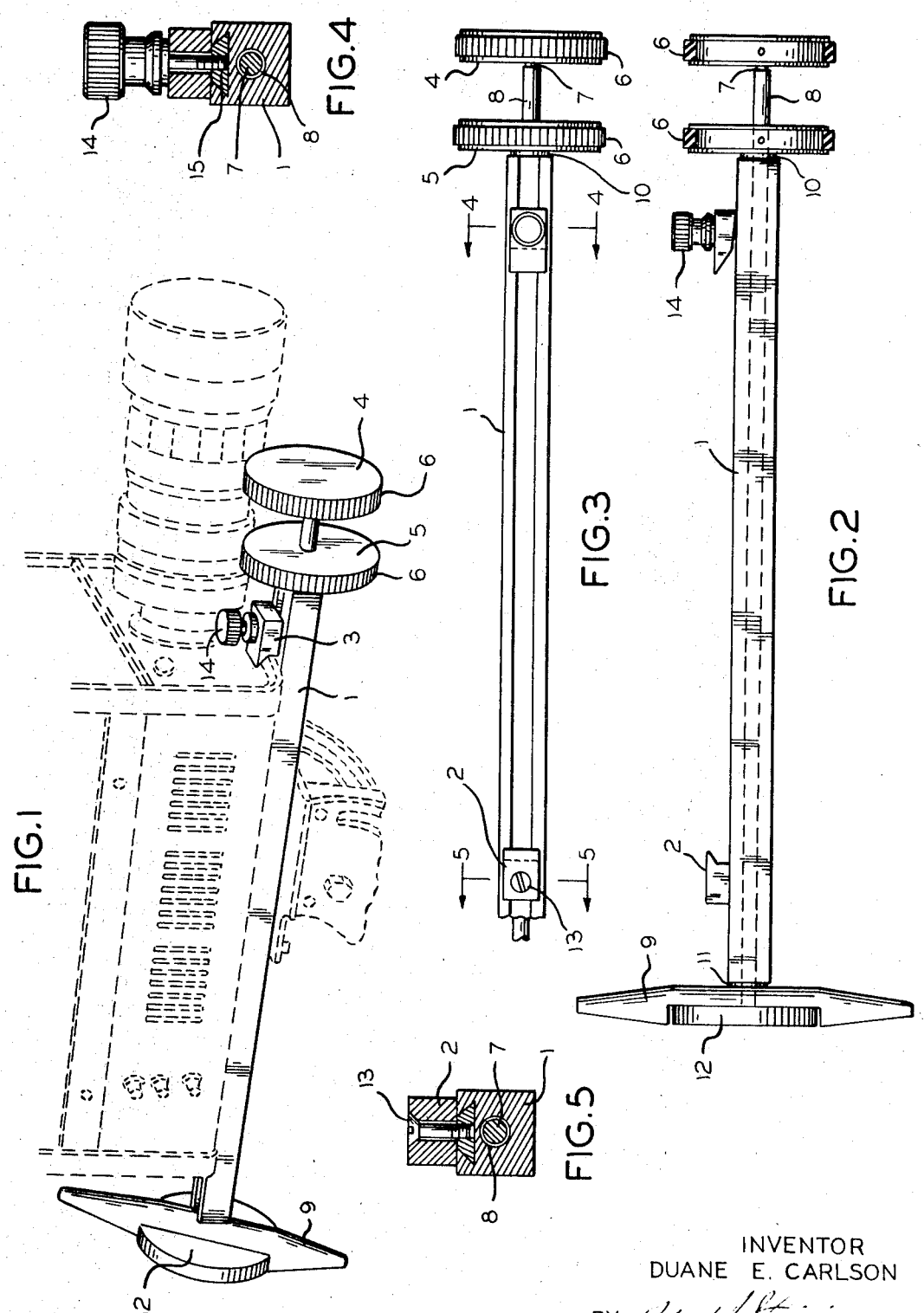
INVENTOR
DUANE E. CARLSON
BY Robert J. Steininger
ATTORNEY

CAMERA LENS REMOTE CONTROL

BACKGROUND OF THE INVENTION

1. Field of the Invention

This invention pertains to the art of apparatus associated with optical communications equipment.

2. Description of Prior Art

Cameras designed for optically communicating form and motion are equipped with means for rapidly adjusting the size of the field communicated in order to vividly convey the operator's intention. This adjustment is obtained by manipulating multiple controls on the lens supports to produce the desired field restriction and focus. Manipulation manually at the lens supports requires a distracting reach by the operator and as a result the skill of the operator is greatly diminished in communicating the desired image. Conventional cameras which are designed for manipulation of the Zoomar at the operator's position use mechanism which is constructed integrally with the cameras of particular manufacturers and such mechanism comprises a substantial part of the cost of manufacture. Less expensive cameras have relied on manipulation by the operator at the lens supports for actuating the Zoomar. This invention, equipped with a frame readily attachable to such latter cameras, enables conversion of inexpensive cameras into a form equivalent with cameras having a considerably greater production cost.

SUMMARY OF INVENTION

The foregoing background illustrates the state of the Zoomar control art at the time of Applicant's invention. Through such invention means is provided for attaching a device to a camera whereby the operator's position at the rear of the camera is equipped with controls for extending and retracting the lenses of the Zoomar longitudinally of the camera. A further object of this invention is to provide a conversion means including a device for cooperation with the lens support controls such that the controls can be actuated at a remote location.

In the attached drawings and following description, the best mode presently contemplated for carrying out the invention is set forth. The manner and process of making and using the invention is set forth in the initial paragraphs hereof and described below in such full, clear, and concise and exact terms as to enable any person skilled in the art to which it pertains, or with which it is most nearly connected, to make and use the invention. It should be emphasized, however, that the subject matter regarded as the invention is not limited solely to the herein embodiment of it, but rather includes everything falling within the claims set forth at the conclusion of this specification.

FIG. 1 is a perspective view of the invention shown mounted on a camera illustrated through use of dotted lines.

FIG. 2 is a side view of the invention removed from the camera.

FIG. 3 is a top view of the invention with control knobs broken away.

FIG. 4 is a cross-sectional view of the variable attaching means taken along the lines 4-4 of FIG. 3.

FIG. 5 is a cross-sectional view of the fixed attaching means taken along the lines 5-5 of FIG. 3.

Referring now to the drawings in detail, FIG. 1 shows the remote control adjustment device for the Zoomar with frame 1 affixed to the bottom of a camera with attaching means 2 held in position on said frame 1 with screw 13 (FIG. 2), and variable attaching means 3 in which thumb screw 14 and nut 15 (FIG. 4) are designed to move longitudinally of said frame into engaging position to secure the frame to such camera.

The position of attachment is such that discs 4 and 5 are held in engaging contact with a pair of lens supports mounted on said camera, each lens support producing longitudinal movement of its respective lens relative to the camera when such support is rotated.

Discs 4 and 5 are equipped with a friction cover 6 on the surface connecting the sides of each such disc, to insure translation of rotation of such discs into an exact counter rotation of the respective lens supports.

Disc 4 is in contact with that lens support which holds the front lens of the Zoomar and is attached for fixed rotation with rod 7. Rod 7 is mounted for rotation within tube 8. The end of rod 7 opposite its point of attachment to disc 4 is fixed to handle 9 such that rotation of handle 9 produces rotation of disc 4 and corresponding counter rotation of the lens support with which it is in contact.

Disc 5 is in contact with the lens support which holds the inner lens of the Zoomar and is fixed for rotation with tube 8. Tube 8 is journaled in bearing 10 mounted on one end of frame 1, and in bearing 11 mounted on the other end of said frame. Said tube 8 is fixed to disc handle 12 at said latter end such that rotation of said disc handle 12 produces rotation of said tube 8 and disc 5 and counter rotation of said inner lens support.

In mounting the invention, frame 1 is placed in parallel alignment longitudinally beneath the camera frame with attaching means 2 engaging one end of the camera frame (not shown). Variable attaching means 3 is then advanced against the other end of said camera frame and fixed in position by tightening thumbscrew 14.

Adjustment is made by releasing thumbscrew 14 and shifting frame 1 laterally of said camera frame until discs 4 and 5 are firmly in contact with lens supports of the camera. Thumbscrew 14 is again tightened to fix frame 1 in position. With the invention so attached, handle 9 and disc handle 12 can be rotated separately or simultaneously to produce the desired field size and focus.

It will be observed from the foregoing description that the Zoomar remote control is readily adaptable for manufacture in varying sizes and for attachment to a variety of cameras having a frame with lens supports mounted opposite the operator's position and with the exterior surfaces of such supports exposed.

Likewise, use of the frictional properties of the lens support control devices is a matter of choice and various linking arrangements between such control devices and the lens supports may be substituted.

While I have illustrated a preferred embodiment of the invention, many modifications may be made without departing from its spirit. Accordingly, I do not wish to be limited to the precise details of construction set forth, but desire to avail myself of all embodiments which are reasonably covered by the appended claims.

Having thus described my invention, what I claim as new and desire to secure by Letters Patent of the United States is:

1. In a camera equipped with a remote control adjustment device for a Zoomar comprising
    an elongated frame having an opening along its longitudinal axis;
    a first tubular shaft journaled within said frame and having a handle fixed to one end thereof;
    a Zoomar lens support rotating means for rotation with said tubular shaft opposite said handle;
    a second shaft journaled within said first shaft and having a handle fixed to one end thereof, and
    Zoomar lens support rotating means fixed to the end of said second shaft opposite said handle for rotating a lens independently of said first tubular shaft.

2. In a camera equipped with a remote control adjustment device for a Zoomar as described in claim 1 in which said means for affixing said frame to said camera comprises at least one block movable along said frame.

3. In a camera equipped with a remote control adjustment device for a Zoomar as described in claim 2 in which said block is equipped with a thumbscrew for affixing the block to said frame.

4. In a camera equipped with a remote control adjustment device for a Zoomar as described in claim 1 in which said Zoomar lens support rotating means comprises a disc having a friction face adjacent its perimeter.

5. In a camera equipped with a remote control adjustment device for a Zoomar as described in claim 4 in which said friction face is a rubber belt fixed for rotation with said disc.

6. In a camera equipped with a remote control adjustment device for a Zoomar as described in claim 1 in which said handle fixed to the second shaft is recessed to receive the handle fixed to said tubular shaft such that the latter is freely rotatable within said recess.

7. In a camera equipped with a remote control adjustment device for a Zoomar as described in claim 6 in which said handle fixed to the second shaft and said handle fixed to said tubular shaft may be rotated simultaneously or independently while being held by a single grip.

8. In a camera equipped with a remote control adjustment device for a Zoomar as described in claim 1 in which said second shaft is constructed of material such that it will rotate freely within said tubular shaft.